United States Patent
Bushelman et al.

(10) Patent No.: US 7,811,671 B2
(45) Date of Patent: Oct. 12, 2010

(54) IMPACT-MODIFIED POLYAMIDE FILM

(75) Inventors: Corinne Bushelman, Cumming, GA (US); Gregory Warkoski, Cumming, GA (US); James K. Doty, Alpharetta, GA (US); Bruce H. Bersted, Cumming, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 456 days.

(21) Appl. No.: 10/568,612

(22) PCT Filed: Aug. 17, 2004

(86) PCT No.: PCT/US2004/026624
§ 371 (c)(1), (2), (4) Date: May 5, 2008

(87) PCT Pub. No.: WO2005/018892
PCT Pub. Date: Mar. 3, 2005

(65) Prior Publication Data
US 2008/0241562 A1    Oct. 2, 2008

Related U.S. Application Data

(60) Provisional application No. 60/496,011, filed on Aug. 19, 2003.

(51) Int. Cl.
*B32B 27/34*    (2006.01)
*B32B 27/06*    (2006.01)

(52) U.S. Cl. .................................................. 428/474.4

(58) Field of Classification Search ............. 428/474.4, 428/474.7, 474.9, 475.5, 477.7
See application file for complete search history.

(56) References Cited

U.S. PATENT DOCUMENTS

| | | |
|---|---|---|
| RE34,447 E | 11/1993 | Poppe et al. |
| 5,416,189 A | 5/1995 | Vandevijver et al. |
| 5,436,294 A | 7/1995 | Desio et al. |
| 5,447,980 A | 9/1995 | Reichmann |
| 5,480,690 A | 1/1996 | Stenger et al. |
| 5,665,815 A | 9/1997 | Vankan et al. |
| 6,306,951 B1 | 10/2001 | Montag et al. |
| 6,359,055 B1 | 3/2002 | Delannoy et al. |
| 6,531,529 B2 | 3/2003 | Bersted et al. |
| 6,765,062 B2 | 7/2004 | Chin et al. |
| 2002/0090472 A1 | 7/2002 | Savic |

FOREIGN PATENT DOCUMENTS

| | | |
|---|---|---|
| EP | 0477027 A2 * | 3/1992 |
| WO | 97/44395 | 11/1997 |

OTHER PUBLICATIONS

U.S. Appl. No. 11/720,128, filed May 24, 2007, Bushelman, et al.
U.S. Appl. No. 11/720,044, filed May 23, 2007, Bushelman, et al.
U.S. Appl. No. 10/568,612, filed Feb. 17, 2006, Bersted, et al.

* cited by examiner

*Primary Examiner*—Michael C Miggins
(74) *Attorney, Agent, or Firm*—Oblon, Spivak, McClelland, Maier & Neustadt, L.L.P.

(57) ABSTRACT

Films made from impact-modified polyamide.

20 Claims, 2 Drawing Sheets

IMPACT-MODIFIED POLYAMIDE FILM

REFERENCE TO RELATED APPLICATIONS

This application is a 371 of PCT/US04/26624, filed Aug. 17, 2004. This application also claims priority to U.S. provisional application 60/496,011 filed Aug. 19, 2003, incorporated herein by reference.

FIELD OF THE INVENTION

The invention relates to films made of impact-modified polyamide. The films according to the present invention comprise, as sole layers, (1) at least one layer L1 comprising an aromatic polyamide and an impact modifier, and, optionally, (2) at least one layer L2 comprising an aliphatic polyamide.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

Polyamide films, such as PA 6, 66, 11, 12 and others are known and are used in a variety of applications. For example, polyamide films are used to provide chemical, water and fuel barrier properties or as insulative components in electrical applications.

However, there remains a need to improve the performance of polyamide films with respect to, for example, its mechanical properties, resistance to water, other solvents and chemicals, electrical insulating properties, etc.

SUMMARY OF THE INVENTION

The present invention provides a film comprising, as sole layers, (1) at least one layer L1 comprising an aromatic polyamide and an impact modifier, and, optionally, (2) at least one layer L2 comprising an aliphatic polyamide. In a preferred embodiment L1 is the sole layer of the film. In another preferred embodiment, layers L1 and L2 are in direct contact with one another and are the sole layers included in the film. In a further preferred embodiment the film includes, as sole layers, three contiguous layers, in the order L1/L2/L1. In yet a further preferred embodiment the film includes, as sole layers, two or more contiguous L1 layers. In a further preferred embodiment, the film includes, as sole layers, any number of contiguous layers of the order $[(L1)_n/(L2)_m]_x$ where x is any integer of 1 or greater, n is any integer of 1 or greater, and m is any integer (e.g., 0, 1, 2, etc.). In another preferred embodiment, the film does not contain a fluoropolymer layer. Where the invention film is a multilayer construction, each of the L1 and L2 layers may be the same or different from one another.

The films of the invention may be made in any manner desired from the identified materials to produce layers L1 and L2, such as by extrusion, such techniques being well known to those of ordinary skill in the art. The size, shape, thicknesses, surface texture, etc. of the invention films are not limited in any way.

DETAILED DESCRIPTION OF THE INVENTION

Figure 1A:
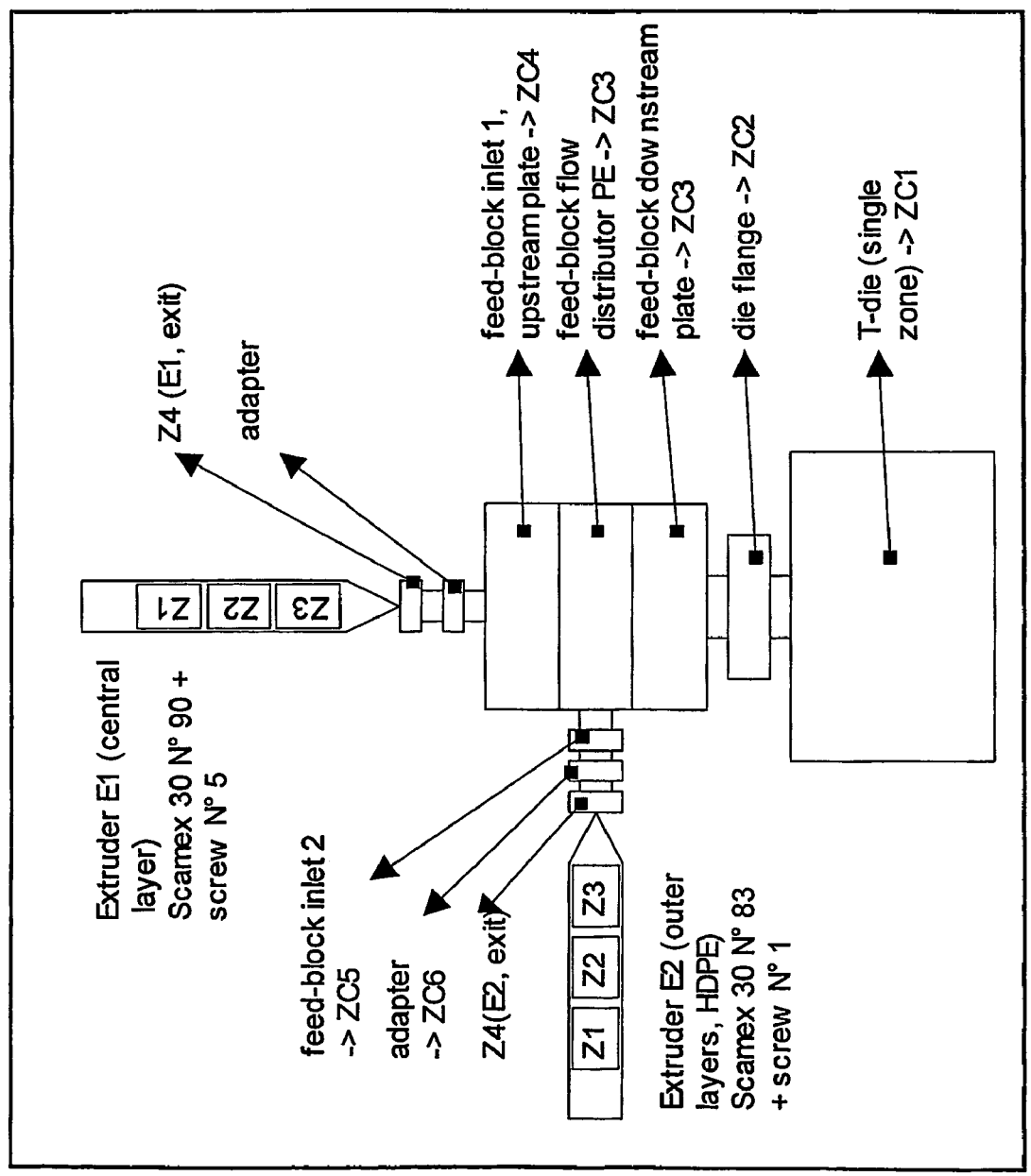
FIG. 1 is an illustration of an extrusion set up useful to extrude films according to the invention.

For multilayer construction of three or more layers, the term "inner layer" is understood to mean the innermost layer(s) of the film. The term "outer layer" is understood to mean the outermost layer of the film; that is, there are no other layers of the film immediately adjacent and external to the outer layer(s). Multilayer film constructions have two outer layers. Where the film is constituted by a single layer, it is termed a "monolayer."

Polyamide

Polyamides are, generally speaking, polymers containing a repeating amide (CONH) functionality. Typically, polyamides are formed by reacting diamine and diacid monomer units (e.g., nylon 6,6), or by polymerizing an amino carboxylic acid or caprolactam (e.g., nylon 6). Polyamides are well known materials. Polyamides that are useful herein include those described in U.S. Pat. Nos. 6,531,529, 6,359,055 5,665, 815, 5,436,294, 5,447,980, RE34,447, U.S. Pat. No. 6,524, 671 (DuPont), U.S. Pat. No. 6,306,951 (BP Corp.) and U.S. Pat. No. 5,416,189 as well as those sold by Solvay Advanced Polymers under the Amodel® and IXEF® brand names. The invention relates to both aromatic and aliphatic polyamides. The aromaticity of the aromatic recurring units can come from the diacid and/or from the diamine for polyamides resulting from polycondensation.

Polyamide Composition L1

The L1 polyamide compositions for films useful herein comprise an aromatic polyamide and an impact modifier.

Aromatic Polyamide

Aromatic polyamides are polymers comprising more than 50 mol % of "Type 1" repeating units, based on 100 mol % repeating units in the polymer. Type 1 repeating units have at least one CONH group in the polymer chain. In addition, Type 1 repeating units are characterized in that at least 30 mol % thereof comprise an aromatic group. Thus, the minimum content of aromatic group-containing repeating units in an aromatic polyamide herein is more than 15 mol % based on 100 mol % repeating units in the polymer. Preferably, the aromatic polyamide of the invention comprises at least 20 mol %, based on 100 mol % of monomers making up the polyamide, of monomers comprising an aromatic group. Although not required, such aromatic groups typically originate in a diacid monomer, and include terephthalic acid, isophthalic acid, phthalic acid, etc. In preferred embodiments the aromatic polyamide comprises at least 30 mol %, based on 100 mol % of monomers making up the polyamide, of monomers comprising an aromatic group, including 35, 40, 45, 50, 55, 60, 65, 70, 75, 80, 85, etc. mol %.

One class of preferred aromatic polyamides are PMXDAs, i.e. aromatic polyamides comprising more than 50 mole % of recurring units formed by the polycondensation reaction between at least one aliphatic diacid and metaxylylenediamine.

The aliphatic diacid can be notably adipic acid.

Suitable PDAs are notably available as IXEF® PMXDAs from Solvay Advanced Polymers.

Another class of preferred aromatic polyamides are polyphthalamides, i.e. aromatic polyamides comprising more than 50 mole % of recurring units formed by the polycondensation reaction between at least one phthalic acid and at least one aliphatic diamine.

The aliphatic diamine can be notably hexamethylenediamine, nonanediamine, 2-methyl-1,5 pentadiamine, and 1,4-diaminobutane.

Suitable polyphthalamides are notably available as AMODEL® polyphthalamides from Solvay Advanced Polymers, L.L.C.

Among polyphthalamides, polyterephthalamides are preferred. Polyterephthalamides are defined as aromatic polyamides comprising more than 50 mole % of recurring units formed by the polycondensation reaction between terephthalic acid and at least one diamine.

One class of preferred polyterephthalamides is polyterephthalamides consisting essentially of recurring units formed by the polycondensation reaction between terephthalic acid and at least one aliphatic diamine. In the polyrephtalamides of this group, the aliphatic diamine comprises preferably from 3 to 9 carbon atoms, and very preferably, it comprises 6 carbon atoms. An example of aliphatic diamine comprising 6 carbon atoms is hexamethylene diamine.

A second group of preferred polyterephthalamides are polyterephthalamides consisting essentially of recurring units formed by the polycondensation reaction between terephthalic acid, isophthalic acid and at least one aliphatic diamine. In this embodiment, the mole ratio of the terepthalic acid and the isopthalic acid can be from 50 to 80 (including 55, 60, 65, 70, and 75) for the terepthalic acid and from 10 to 40 (including 15, 20, 25, and 35) for the isopthalic acid. In another embodiment, the mole ratio can be from 35 to 65 for the terepthalic acid and not more than 20 for the isopthalic acid.

A third group of preferred polyterephthalamides are polyterephthalamides consisting essentially of recurring units formed by the polycondensation reaction between terephthalic acid, at least one aliphatic diacid and at least one aliphatic diamine. In this embodiment, the mole ratio of the terepthalic acid and aliphatic diacid can be from 50 to 80 (including 55, 60, 65, 70, and 75) for the terepthalic acid and not more than 25 (including 5, 10, 15, and 20) for the aliphatic diacid. In another embodiment, the mole ratio can be from 35 to 65 for the terepthalic acid and from 30 to 60 for the aliphatic diacid.

A fourth group of preferred polyterephthalamides are polyterephthalamides consisting essentially of recurring units formed by the polycondensation reaction between terephthalic acid, isophthalic acid, at least one aliphatic diacid and at least one aliphatic diamine. In this embodiment, the mole ratio of the terepthalic acid and aliphatic diacid can be from 50 to 80 (including 55, 60, 65, 70, and 75) for the terepthalic acid; from 10 to 40 (including 15, 20, 25, and 35) for the isopthalic acid; and not more than 25 (including 5, 10, 15, and 20) for the aliphatic diacid. In another embodiment, the mole ratio can be from 35 to 65 for the terepthalic acid; not more than 20 for the isopthalic acid; and from 30 to 60 for the aliphatic diacid.

Another preferred aromatic polyamide useful herein is one made from terephthalic acid, adipic acid, optionally isophthalic acid, and hexamethylene diamine.

In another preferred embodiment the aromatic polyamide is a polyamide with at least 50 mol. %, including up to 100 mol %, of recurring units obtained by the polycondensation reaction between terephthalic, isophthalic, adipic acid; and at least one diamine, preferably an aliphatic one. Within this group, the mole ratio of terephthalic/isophthalic/adipic acid can be from 50 to 80/from 10 to 40/not more than 25. In another embodiment the mole ratio of terephthalic/isophthalic/adipic acid can be from 35 to 65/not more than 20/from 30 to 60. In preferred embodiments the diamine component for these acid mixtures is HMDA.

In certain embodiments of the present invention, the dicarboxylic acid component used in forming the polyphthalamide comprises a mole ratio of aromatic dicarboxylic groups in the range from at least about 50 mole % aromatic groups to about 100% aromatic groups. In a preferred embodiment of the present invention, the polyphthalamide polymer comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units. Another useful aromatic polyamide is one made from terephthalic acid, isophthalic acid and an aliphatic amine such as HMDA, for example using a 70/30 ratio of TA/IA. Particularly suitable polyphthalamides for use in the present invention are available as AMODEL® A-1000, A-4000, A-5000, and A-6000 polyphthalamides from Solvay Advanced Polymers, LLC. Suitable polyphthalamides for use in the present invention are disclosed in previously referenced U.S. Pat. Nos. 5,436,294; 5,447,980; and Re34,447 to Poppe et al.

Of course, more than one aromatic polyamide may be used in polyamide composition L1.

Impact Modifier

The impact modifiers useful herein are not particularly limited, so long as they impart useful properties to the aromatic polyamide component of the invention L1 layer, such as sufficient tensile elongation at yield and break. For example, any rubbery low-modulus functionalized polyolefin impact modifier with a glass transition temperature lower than 0° C. is suitable for this invention, including functionalized impact modifiers disclosed in U.S. Pat. Nos. 5,436,294 and 5,447,980. Useful impact modifiers include polyolefins, preferably functionalized polyolefins, and especially elastomers such as SEBS and EPDM.

Useful functionalized polyolefin impact modifiers are available from commercial sources, including maleated polypropylenes and ethylene-propylene copolymers available as EXXELOR™ PO and maleic anhydride-functionalized ethylene-propylene copolymer rubber comprising about 0.6 weight percent pendant succinic anhydride groups, such as EXXELOR® RTM. VA 1801 from the Exxon Mobil Chemical Company; acrylate-modified polyethylenes available as SURLYN®, such as SURLYN® 9920, methacrylic acid-modified polyethylene from the DuPont Company; and PRIMACOR®, such as PRIMACOR® 1410 XT, acrylic acid-modified polyethylene, from the Dow Chemical Company; maleic anhydride-modified styrene-ethylene-butylene-styrene (SEBS) block copolymer, such as KRATON® FG1901X, a SEBS that has been grafted with about 2 weight % maleic anhydride, available from Kraton Polymers; maleic anhydride-functionalized ethylene-propylene-diene monomer (EPDM) terpolymer rubber, such as ROYALTUF® 498, a 1% maleic anhydride functionalized EPDM, available from the Crompton Corporation. The films of the present invention are not limited to only those formed with these impact modifiers. Suitable functional groups on the impact modifier include any chemical moieties that can react with end groups of the polyamide to provide enhanced adhesion to the high temperature matrix.

Other functionalized impact modifiers that may also be used in the practice of the invention include ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Suitable higher alpha-olefins include $C_3$ to $C_8$ alpha-olefins such as, for example, propylene, butene-1, hexene-1 and styrene. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers. The functionalized polyolefins that may be used in the present invention include those having a melt index in the range of about 0.5 to about 200 g/10 min.

Suitable dienes for use in the preparation of ethylene-alpha-olefin-diene terpolymers are non-conjugated dienes having 4 to about 24 carbon atoms, examples of which include 1,4-hexadiene, dicyclopentadiene and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene copolymers having about 50 to about 95 mole percent ethylene units and about 5 to about 50 mole % propylene units are included among these. In terpolymers comprising polymerized diene monomer, the diene unit content can range up to about 10 mole %, and about 1 to about 5 mole % in certain embodiments. Also suitable are the corresponding block copolymers comprising two or more polymeric blocks, each formed of one or more monomers selected from ethylene and the higher alpha-olefin. The functionalized polyolefins will generally further comprise about 0.1 to about 10 weight percent functional groups.

Other impact modifiers useful herein include those described in U.S. Pat. No. 6,765,062 (Ciba Specialty Chemicals Corporation) and EP 901 507 B1 (DuPont).

Still other impact modifiers useful herein include acrylic impact modifiers commercialized as Paraloid® impact modifiers by Rohm & Haas.

The amount of impact modifier present in composition L1 is not limited and will preferably be a quantity sufficient to impart sufficient tensile elongation at yield and break. Generally, polyamide composition L1 will comprise from about 2 weight % to about 40 weight % impact modifier, based on total weight of composition L1, including for example 5, 10, 15, 20, 25, 30 and 35 weight %. However, the impact modifier can be present in amounts as little as, e.g., 0.1 weight %.

The impact modifier and aromatic polyamide can be mixed together in any manner, and mixing can occur before, e.g., extrusion, or the materials may be mixed in the extruder.

Of course, more than one impact modifier may be used in Polyamide composition L1.

Polyamide Composition L2

The L2 polyamide compositions useful herein form optional layers of the invention film and comprise an aliphatic polyamide. Aliphatic polyamides are polymers comprising more than 50 mol % of "Type 2" repeating units, based on 100 mol % repeating units in the polymer. Type 2 repeating units have at least one CONH group in the polymer chain. In addition, Type 2 repeating units are characterized in that less than 30 mol % thereof comprise an aromatic group. Thus, the maximum content of aromatic group-containing repeating units in an aliphatic polyamide herein is less than 15 mol % based on 100 mol % repeating units in the polymer. Preferably, the aliphatic polyamide comprises more than 85 mol %, for example 90%, etc., based on 100 mol % of monomers making up the polyamide, of monomers comprising an aliphatic group and having no aromatic group. Although not required, such aliphatic groups may originate in a diamine monomer, and include aliphatic diamines comprising 4 to 12 carbon atoms, such as hexamethylene diamine (HMDA), nonane diamine, 2-methyl-1,5 pentadiamine, and 1,4-diaminobutane, etc. One useful diacid source of aliphatic units is adipic acid. Useful examples of invention aliphatic L2 polyamides include aliphatic nylon (e.g., PA6, PA6,6, PA6,12, PA4,6, PA11, PA12, etc.).

Of course, more than one aliphatic polyamide may be used in polyamide composition L2. In addition, the impact modifiers described above may be used in polyamide composition L2 if desired.

Additives

Polyamide compositions L1 and L2 may each, individually, optionally further contain one or more additives. Useful additives include, for example, an external lubricant, such as PTFE or low density polyethylene (LDPE), to facilitate extrusion. Suitable powdered PTFE include POLYMIST® F5A available from Solvay Solexis.

Another useful additive is a heat stabilizer. Suitable heat stabilizers include copper-containing stabilizers comprising a copper compound soluble in the polyamide and an alkali metal halide. More particularly, in certain embodiments the stabilizer comprises a copper (I) salt, for example cuprous acetate, cuprous stearate, a cuprous organic complex compound such as copper acetylacetonate, a cuprous halide or the like, and an alkali metal halide. In certain embodiments of the present invention, the stabilizer comprises a copper halide selected from copper iodide and copper bromide and an alkali metal halide selected from the iodides and bromides of lithium, sodium, and potassium. Formulations comprising copper (I) halide, an alkali metal halide and a phosphorus compound can also be employed to improve the stability of films formed from polyphthalamide compositions during extended exposure to temperatures up to about 140° C. The amount of the stabilizer used is preferably that amount sufficient to provide a level of from about 50 ppm to about 1000 ppm copper. Preferred compositions of the invention comprise an alkali metal halide and copper (I) halide at a weight ratio the range of from about 2.5 to about 10, and most preferably from about 8 to about 10. Generally, the combined weight of copper and alkali metal halide compound in a stabilized polyamide composition ranges from about 0.01 weight % to about 2.5 weight %. In certain other stabilized polyamide compositions used to form fihns according to the present invention, the stabilizer is present in the range of from about 0.1 weight % to about 1.5 weight %.

A particularly suitable stabilizer for polyamide compositions according to the present invention comprises pellets of a 10:1 by weight mixture of potassium iodide and cuprous iodide with a magnesium stearate binder. The potassium iodide/cuprous iodide heat stabilizer provides protection against long term heat aging, such as exposure to under-the-hood automobile temperatures.

Another useful additive is a filler such as a reinforcing filler, or structural fiber. Structural fibers useful in forming filled articles and composite products include glass fiber, carbon or graphite fibers and fibers formed of silicon carbide, alumina, titania, boron and the like, as well as fibers formed from high temperature engineering resins such as, for example, poly(benzothiazole), poly(benzimidazole), polyarylates, poly(benzoxazole), aromatic polyamides, polyaryl ethers and the like, and may include mixtures comprising two or more such fibers. Suitable fibers useful herein include glass fibers, carbon fibers and aromatic polyamide fibers such as the fibers sold by the DuPont Company under the trade name KEVLAR®.

Another useful additive is an antioxidant. Useful antioxidants include Nauguard 445, phenols (for ex. Irganox 1010, Irganox 1098 from Ciba), phosphites, phosphonites (e.g., Irgafos 168 from Ciba, P-EPQ from Clariant or Ciba), thiosynergists (e.g., Lowinox DSTDP from Great Lakes), hindered amine stabilizers (e,g., Chimasorb 944 from Ciba), hydroxyl amines, benzofuranone derivatives, acryloyl modified phenols, etc.

Other fillers which may also be used in polyamide compositions according to the invention include antistatic additives such as carbon powders, multi-wall carbon nanotubes and single wall nanotubes as well as flake, spherical and fibrous particulate filler reinforcements and nucleating agents such as talc, mica, titanium dioxide, potassium titanate, silica, kaolin, chalk, alumina, mineral fillers, and the like. The fillers and structural fiber may be used alone or in any combination.

Further useful additives include, without limitation, pigments, dyes, flame retardants, and the like, including those additives commonly used in the resin arts. The additives may be employed alone or in any combination, as needed. For particular applications, it may also be useful to include plasticizers, lubricants, and mold release agents, as well as thermal, oxidative and light stabilizers, and the like. The levels of such additives can be determined for the particular use envisioned by one of ordinary skill in the art in view of this disclosure.

Methods

The invention films may be made by any technique known in the art or later developed, including in particular, extrusion. In this regard, one of ordinary skill in the art is capable of forming the films of the invention as described herein using polyamide compositions L1 and L2 in view of this disclosure.

The physical dimensions of the film of the invention are not limited. Preferred thicknesses of single layer films or multilayer films range from 5 microns to 1000 microns (0.05 to 1 mm), more preferably 15 microns to 900 microns (0.15 mm to 0.9 mm), including all values and ranges there between, notably 50, 100, 200, 400, 600 and 800 microns.

Films of the invention of impact modified polyamide can be extruded in the normal manner, for example on existing film lines, and can provide very thin films (e.g., 5 to 50 microns) if desired. As discussed above, the films can be mono- or multi-layered. Properties of the films can be varied by varying the proportions of materials making up the film, and by varying the filming process. Two layer films having construction of different L1's or L1/L2 can be produced without the need of tie layers. Three or more than three layer films can also be prepared. Excellent results have been obtained notably with:

films comprising, as sole layer(s), at least one layer L1 films comprising, as sole layer, one L1 layer (monolayer films);

films comprising, as sole layers, at least two L1 layers;

films comprising, as sole layers, at least one layer L1 and at least one layer L2;

films comprising, as sole layers, two layers, the first one being a L1 layer and the other one being a L2 layer (bilayer films); in said films, L1 can either be the inner or the outer layer;

films comprising, as sole layers, three layers of L1/L2/L1, wherein L1 is both an inner and outer layer and L2 is the intermediate layer.

Films of the invention have high tensile properties and high impact strength; and show good resistance to abrasion. Mechanical strength, stiffness and tear strength are enhanced by biaxial orientation. Thus, films of the invention can be employed in a variety of situations where polyamide films are usually employed but provide better performance.

Films of the invention pick up water slower than and have a lower transmission rate relative to conventional polyamide films (PA 6 or PA 66). Thus, films of the invention, in one embodiment, can be used in hot water applications where low permeation and higher temperature is required.

Films of the invention also have significantly lower permeation rates for fuel, and gases than conventional polyamide films such as polyamide 12, 11, 6 or 66 films. Thus, in another embodiment, films of the invention can be used at higher temperature and can be used in high temperature fuel system applications, and particularly at higher temperatures than conventional polyamide films.

In another embodiment, films of the invention can be used usable as insulating devices in electric motors and other electronic devices. The use of films of the invention in electronic applications is enhanced by the higher thermal performance and stable electrical properties in high humidity relative to conventional polyamide films such as PA 12, PA 11 PA 66 or PA 6.

In another embodiment, films of the invention can be used as a substrate for flexible printed circuits and tape automated bonded laminates. A laminate may be bonded on both sides of the film and use known acrylics or epoxies to accomplish for the bonding.

Films of the invention can also be used in industrial transformers for insulators and compressor motor coil insulators, etc.

Films of the invention have excellent chemical resistance to a wide variety of materials such as esters, ketones, weak acids, aliphatic and aromatic hydrocarbons etc. Unlike aliphatic conventional polyamides, such as PA 6 or 66, films of the present invention have good resistance to alcohols. Thus, in another embodiment, films of the invention can be used as corrosion resistant barriers in the manufacture or preparation of chemicals.

EXAMPLES

Provided below are examples illustrative of the present invention, but not limitative thereof.

Table 1 describes two compositions. In addition, a control composition C1 was prepared of unmodified AMODEL® A-1006 PPA.

TABLE 1

Polyphthalamide Compositions

| Component | Example 1 | Example 2 |
|---|---|---|
| Amodel ® A-1004 PPA (wt. %) | 75.75 | 74.75 |
| maleic anhydride functionalized EPDM (wt. %) | 0 | 25 |
| maleic anhydride functionalized SEBS (wt. %) | 25 | 0 |
| Powdered PTFE (wt %) | 0.25 | 0.25 |
| Total | 100 | 100 |

Figure 1B:
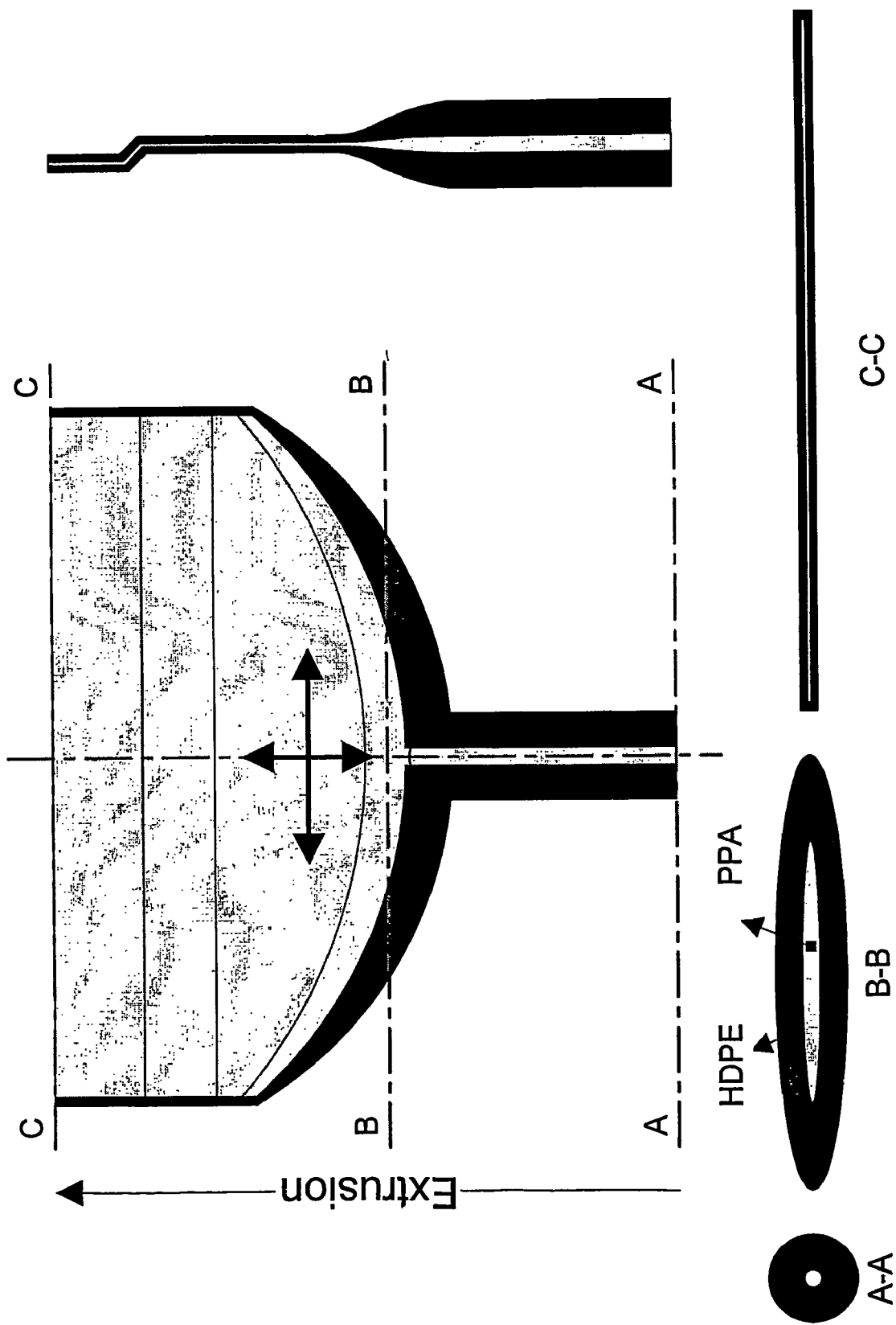

Films of Examples 1, 2 and C1 were produced by extrusion. For these examples, the films were produced by co-extrusion/encapsulation. The set up for this process is shown in FIG. 1. Two 30 mm extruders were used E1 and E2. Standard polyethylene and polyamide screws were used. The extruders were connected to a T-die via a feed block.

The PPA pellets were in extruder E1 and a high viscosity pipe grade of polyethylene (Eltex® B4922) was in E2. The PPA film was encapsulated between the polyethylene. There was no adhesion of the PPA film to the polyethylene film. Peeling of the central PPA layer from the HDPE layers was easy. Set up conditions are shown in Table 2.

TABLE 2

|  | Example 1 | Example 2 | C1 |
|---|---|---|---|
| Extruder E1 |  |  |  |
| Z1 | 280 | 280 | 280 |
| Z2 | 315 | 300 | 315 |
| Z3 | 325 | 330 | 325 |
| Z4 | 325 | 300 | 325 |
| Extruder E2 |  |  |  |
| Z1 | 150 | 280 | 150 |
| Z2 | 295 | 300 | 295 |
| Z3 | 325 | 330 | 325 |
| Z4 | 325 | 330 | 325 |
| Feed block | 325 | 330 | 325 |
| Die | 325 | 330 | 325 |

Depending on the screw speed and the die separation films of Example 1 and 2 and the control C1 from 50 to 300 microns in thickness could be obtained.

ISO 1BA tensile specimens were punched from the films. They were elongated at a crosshead speed of 0.5 mm/min and tested under the conditions of ISO 527. As shown below in Table 3, impact modification provides polymer compositions that have higher average tensile elongation at yield and break over unmodified control C1. In fact, invention PPA compositions comprising impact modifier have tensile elongation at yield and break more than twice as high as control. The higher tensile elongation at yield and break provides greater latitude in the processing parameters for barrier applications and thermoforming applications of the present invention.

TABLE 3

|  | Examples | | |
|---|---|---|---|
|  | 1 | 2 | C1 |
| Impact Modifier | SEBS | EPDM | Unmodified |
| Test Temperature (° C.) | 23 | 23 | 23 |
| Prior Conditioning | Dry as molded | Dry as molded | 23° C./50% RH |
| Average Tensile Elongation at Yield (%) | 7.7 | 9.3 | 3.0 |
| Average Tensile Elongation at Break (%) | 154 | 169 | 66 |

Film Extrusion Without Encapsulation

Formulation Example 2 was run on an 18 mm Brabender single screw machine. Set up is similar to FIG. 1 with exception that the T-die was replaced with a 100 mm wide slit die.

A standard polyamide screw was used. Barrel settings from rear to front were from 250 to 330° C. With a screw RPM of 25 mm and a torque of 4 kN, films of 50-150 microns thickness were obtained depending on the roll speed.

Large Scale Film Extrusion

Formulation Example 2 was run on commercial size (76 mm diameter) single screw equipment. The screw was a 20:1/L/D with a 3:1 compression ratio. Rolls were heated to 125° C. Barrel settings from rear to front were set from 310 to 325° C. The adapter and die were set at 330° C. With a screw speed of 70 rpm, film of 0.4 mm thickness was produced at rates of 2 to 7 meter/minute depending on the head pressure.

Tensile properties of the film above were measured by ASTM D638:
Tensile strength@Yield=54.6 MPa
Elongation@Yield=5.2%
Tensile strength@Break=67.8 MPa
Elongation@Break=110%

This demonstrates clearly the commercial utility in the manufacturer of an impact modified polyphthalamide film and that the properties are acceptable for intended end use.

Barrier Properties

Fuel permeation tests were conducted on the Example compositions, control, and comparative compositions. The results of the fuel permeation tests are shown in Table 4 below. The fuel permeation tests were performed on films from the same specimens as those listed in Table 3.

In addition to impact modified compositions Examples 1 and 2, permeability measurements were also carried out on PA 12, PA 6, Solef® 1010 PVDF and C1 (Amodel A-1006).

The fuel tested is CTF1, a 45/45/10 by volume isooctane/toluene/ethanol blend. See standard SAE J1681 rev. January 2000.

The measured fuel permeability is expressed as the number of grams of permeant that would permeate through a sheet of thickness 1 mm thickness and a surface area of 1 $m^2$ sheet in a 1 day period. The permeability of the impact modified PPA, Examples 1 and 2, is far superior to aliphatic polyamides (PA 6 and PA 12) and similar to PVDF.

Despite the fact that the incorporation of elastomers in the PPA compositions of the invention is generally thought to be detrimental to the barrier properties of PPA, very good barrier properties are retained.

TABLE 4

| CTF1 fuel @ 60° C. | | |
|---|---|---|
| Examples | Avg. Thickness μm | Total Permeation Factor g · mm/$m^2$ · day |
| C1, Control, A-1006 | 58 | 0.03 |
| Example 1 | 51 | 1.86 |
| Example 2 | 98 | 1.95 |
| PVDF Solvay Solef ® 1010 | 50 | 2.5 |
| PA 6, Capron ® DF200 | 52 | 14.5 |
| PA 12, Vestamid ® L2140 | 50 | 98.1 |

Thermoforming.

Films of Example 2 of thickness 0.4 mm were successfully thermoformed. A square piece of film is clamped into a frame, similar to the canvas of a picture. The frame is indexed into an oven at 290 to 300° C. for 15-45 seconds. The frame indexes from the oven directly over the tool. Once in position the tool is raised pushing up and thermoform the film into the desired article. Temperatures less than 280° C. cause the film to be too rigid to be formed. A temperature greater than 305° C. caused the film to blister or melt.

Stamping.

Films of Example 2 of thickness 0.4 mm were successfully stamped into a variety of shapes using commercial equipment. This technique is useful for the forming of flexible circuit boards for the electronics industry.

Heat Aging Comparisons with PA12.

Table 5 describes two heat stabilized compositions (Example 3 and Example 4).

TABLE 5

Polyphthalamide Compositions

| Component | Example 3 | Example 4 |
|---|---|---|
| Amodel ® A-1004 PPA (wt. %) | 74.18 | 73.18 |
| maleic anhydride functionalized EPDM (wt. %) | 0 | 25 |
| maleic anhydride functionalized SEBS (wt. %) | 24 | 0 |
| 10/1 KI/CuI stabilizer (wt %) | 1.57 | 1.57 |
| Powdered PTFE (wt %) | 0.25 | 0.25 |
| Total | 100 | 100 |

A comparison of the compositions according to Examples 3 and 4 with heat stabilized PA12 is provided in Table 6.

TABLE 6

| | Izod Impact (ft-lbs/in.) Strength After 255 Hours at Temperature | | | |
|---|---|---|---|---|
| Examples | 23° C. (Initial) | 140° C. | 150° C. | 160° C. |
| PA12 Heat Stabilized | 20.46 | 0.67 | 0.69 | 0.16 |
| Example 3 | 19.73 | 17.07 | 15.02 | 12.47 |
| Example 4 | 19.8 | 17.07 | 14.99 | 11.77 |

As can be seen, the PA12 undergoes a catastrophic loss in Izod impact strength after heat aging. Consequently, the partially aromatic impact modified polyamides are a much safer choice for retention of impact properties after long term exposure to elevated temperatures in the presence of air.

As described herein, in certain embodiments of the present invention, the film comprises a monolayer structure of the L1 composition. As used herein, a "monolayer" is formed from single layer of a polymer composition wherein the polymer composition is substantially the same across the entire thickness of the layer. In certain embodiments of the present invention, the thickness of the monolayer can range from about 0.05 mm to about 1.0 mm. In certain embodiments of the present invention, the monolayer thickness ranges from about 0.15 mm to 0.9 mm.

The films can have surfaces that are rough, smooth, corrugated, etc. that are of a constant thickness throughout or a variable thickness, etc. In addition, the invention films can be used to enclose or encapsulate a content, and the content can vary widely. For example, the film of the invention can be used as a protection system. In this regard the invention is also disclosed as actually containing or holding its intended content.

The above written description of the invention provides a manner and process of making and using it such that any person skilled in this art is enabled to make and use the same, this enablement being provided in particular for the subject matter of the appended claims, which make up a part of the original description and including a film comprising, as sole layers, (1) at least one layer L1 comprising an aromatic polyamide and an impact modifier, and, optionally, (2) at least one layer L2 comprising an aliphatic polyamide.

Similarly enabled preferred embodiments of the invention include films wherein the aromatic polyamide is a polyphthalamide; the aliphatic polyamide is an aliphatic nylon; the impact modifier is selected from the group consisting of EPDM, SEBS, and mixtures thereof; the aromatic polyamide is a polyamide having at least 50 mol. % of recurring units obtained by a polycondensation reaction between at least one dicarboxylic acid selected from the group consisting of phthalic, terephthalic, and isophthalic acids and mixtures thereof and at least one aliphatic diamine; the polyphthalamide comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units; the impact modifier is a rubber; the rubber is a functionalized polyolefin-based rubber; the functionalized polyolefin-based rubber is a maleic anhydride functionalized styrene-ethylene-butylene-styrene block copolymer; the functionalized polyolefin based rubber is a maleic anhydride functionalized ethylene-propylene-diene monomer rubber; the layers are contiguous layers of the order $[(L1)_n/(L2)_m]_x$ where x is any integer of 1 or greater, n is any integer of 1 or greater, and m is any integer; the layer L1 further comprises an external lubricant; the external lubricant is selected from the group consisting of polytetrafluoroethylene, low density polyethylene, and mixtures thereof; layer L1 further comprises a heat stabilizer comprising at least one copper (I) salt and at least one alkali metal halide; the heat stabilizer comprises at least one copper halide selected from the group consisting of copper iodide and copper bromide and at least one alkali metal halide selected from the group consisting of the iodides and bromides of lithium, sodium, and potassium; the film consists of, as sole layer, a monolayer comprising an aromatic polyamide and an impact modifier; and a method for making a film comprising, as sole layers, (1) at least one layer L1 comprising an aromatic polyamide and an impact modifier, and, optionally, (2) at least one layer L2 comprising an aliphatic polyamide, comprising extruding an aromatic polyamide and an impact modifier, and optionally extruding an aliphatic polyamide.

As used herein, where a certain polymer is noted as being "obtained from" or "comprising", etc. one or more monomers (or monomer units) this description is of the finished polymer material itself and the repeating units therein that make up, in whole or part, this finished product. One of ordinary skill in the art understands that, speaking precisely, a polymer does not include individual, unreacted "monomers," but instead is made up of repeating units derived from reacted monomers.

All references, patents, applications, tests, standards, documents, publications, brochures, texts, articles, etc. mentioned herein are incorporated herein by reference. Similarly, all brochures, technical information sheets, etc. for all commercially available materials are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A film comprising, as sole layers,
   (1) at least one layer L1 comprising an aromatic polyamide and an impact modifier, and,
   (2) at least one layer L2 comprising an aliphatic polyamide.

2. The film according to claim 1, wherein said layers are contiguous layers of the order $[(L1)_n/(L2)_m]_x$ where x is any integer of 1 or greater, n is any integer of 1 or greater, and m is any integer of 1 or greater.

3. The film according to claim 1, wherein said layer L1 further comprises an external lubricant.

4. The film according to claim 1, wherein said layer L1 further comprises a heat stabilizer comprising at least one copper (I) salt and at least one alkali metal halide.

5. The film according to claim 1, wherein layer L1 further comprises an anti-oxidant.

6. The film according to claim 1, wherein said aromatic polyamide is a polyphthalamide.

7. The film according to claim 6, wherein the polyphthalamide comprises from about 50 mole % to about 95 mole % hexamethylene terephthalamide units, from about 25 mole % to about 0 mole % hexamethylene isophthalamide units, and from about 50 mole % to about 5 mole % hexamethylene adipamide units.

8. The film according to claim 7, wherein the impact modifier is selected from the group consisting of a maleic anhydride functionalized ethylene-propylene-diene monomer rubber, a maleic anhydride functionalized styrene ethylene-butylene-styrene block copolymer, and mixtures thereof.

9. The film according to claim 1, wherein the impact modifier is a rubber.

10. The film according to claim 9, wherein the rubber is a functionalized polyolefin-based rubber.

11. The film according to claim 10, wherein the functionalized polyolefin-based rubber is a maleic anhydride functionalized styrene-ethylene-butylene-styrene block copolymer or a maleic anhydride functionalized ethylene-propylene-diene monomer rubber.

12. The film according to claim 1, comprising, as sole layers, at least one layer L1 and at least one layer L2.

13. The film according to claim 12, comprising, as sole layers, two layers, the first one being a L1 layer and the other one being a L2 layer.

14. The film according to claim 13, wherein L1 is the inner layer.

15. The film according to claim 12, which comprises, as sole layers, three layers of L1/L2/L1, wherein L1 is both an inner and outer layer and L2 is the intermediate layer.

16. The film according to claim 13, wherein L1 is the outer layer.

17. The film according to claim 1, wherein said aliphatic polyamide is selected from PA6, PA6,6, PA4,6, PA11, PA12, and PA6,12.

18. The film according to claim 17, wherein said impact modifier comprises maleic anhydride functionalized ethylene-propylene-diene monomer rubber and an ethylene-$C_3$-$C_8$ alpha-olefin polymer.

19. The film according to claim 18, wherein L1 comprises an aromatic polyamide obtained by the polycondensation reaction between hexamethylenediamine and a terephthalic/isophthalic/adipic acid composition wherein the mole ratio of terephthalic/isophthalic/adipic acids in the acid composition is 50 to 80/ from 10 to 40/ not more than 25.

20. The film according to claim 18, wherein L1 comprises a polyphthalamide comprising from about 50 mole % to about 95 mole % hexamethylene terephthalamide units, from about 25 mole % to about 0 mole % hexamethylene isophthalamide units, and from about 50 mole % to about 5 mole % hexamethylene adipamide units.

* * * * *